United States Patent [19]

Horner

[11] Patent Number: 4,618,268

[45] Date of Patent: Oct. 21, 1986

[54] METHOD AND APPARATUS FOR SENSING AVERAGE TEMPERATURE

[76] Inventor: John A. Horner, 211 E. Grove St., Kawkawlin, Mich. 48631

[21] Appl. No.: 691,410

[22] Filed: Jan. 9, 1985

[51] Int. Cl.[4] ............................................. G01K 3/06
[52] U.S. Cl. .................................... 374/115; 73/292; 374/102; 374/116; 374/185
[58] Field of Search ............... 374/102, 115, 116, 136, 374/185; 73/292, 295; 361/284

[56] References Cited

U.S. PATENT DOCUMENTS

| | | | |
|---|---|---|---|
| Re. 23,844 | 6/1954 | Condon | 361/284 |
| 2,588,014 | 3/1952 | Knudsen | 374/185 |
| 2,691,889 | 10/1954 | Dion et al. | 374/115 |
| 2,752,543 | 6/1956 | Smith | 361/284 |
| 2,760,373 | 8/1956 | Quist | 73/292 |
| 3,015,954 | 1/1962 | Dalglish | 374/116 |
| 3,111,846 | 11/1963 | Willer, Jr. et al. | 374/116 |
| 3,201,990 | 8/1965 | Wald | 374/116 |
| 3,469,447 | 9/1969 | Becker | 374/116 |
| 3,470,744 | 10/1969 | Lindberg | 374/115 |
| 3,580,055 | 5/1971 | White | 73/292 |
| 3,653,262 | 4/1972 | Ehrenfried et al. | 73/292 |
| 3,864,975 | 2/1975 | Springfield | 374/116 |

FOREIGN PATENT DOCUMENTS

| | | | |
|---|---|---|---|
| 1601204 | 9/1970 | France | 374/115 |
| 0070416 | 4/1982 | Japan | 374/115 |

*Primary Examiner*—Charles Frankfort
*Assistant Examiner*—Thomas B. Will
*Attorney, Agent, or Firm*—Irvin L. Groh

[57] ABSTRACT

A device and method for detecting average temperature, particularly adapted for determining the average liquid temperature in an underground horizontally disposed cylindrical tank. The sensing element, in the form of a wire of known temperature versus electrical resistance characteristic is contained within an extensible cylindrical helical coil of plastic tubing which can be introduced into the tank and extended to the overall height of the liquid by gravity through a weight on one end of the coil or by the use of an extendible rod inserted into the center of the coil. The tubing is preformed or arranged relative to the extensible rod to present a greater number of coil turns at the center of the tank to compensate for greater liquid volume.

16 Claims, 2 Drawing Figures

METHOD AND APPARATUS FOR SENSING AVERAGE TEMPERATURE

This invention relates to a device and method for measuring average temperature and, more particularly, to means for measuring the average temperature of a liquid in an underground storage tank with such precision that minute temperature differences can be detected over a period of time.

The testing of underground storage tanks for leakage has been subject of considerable effort in recent years, and while the National Fire Protection Association has established certain minimal acceptable standards (NFPA No. 329, the most recent edition being approved by the American National Standards Institute, effective June 29, 1983, as ANSI/NFPA 329), it has been in fact difficult to make accurate enough measurements to insure compliance with the maximum permissible loss of 0.05 gallons per hour. As pointed out in paragraph 4-3.12.6 of the above mentioned NFPA standard, there are three major factors which must be considered in leak detection: gross volume change per given period of time, temperature change for the same period of time, and movement of tank ends as pressure is increased.

In my copending patent application, Ser. No. 534,310 filed Sept. 21, 1983, now U.S. Pat. No. 4,571,987 entitled Leak Detector, I have presented a method and apparatus for greatly improving the accuracy of the gross volume detection and average temperature measurement. The importance of an accurate temperature measurement is emphasized therein by noting that a 10,000 gallon storage tank filled with gasoline which has a volumetric coefficient of expansion of 0.0007 per °F. will have a change of volume equal to the maximum permissible leakage rate of 0.05 gallons/hour with only a 0.007° F. change in temperature. In the aforementioned patent application, average temperature is measured with tubular probe which is immersed in the tank liquid for substantially the entire depth of the tank. The probe is filled with a liquid having the same coefficient of expansion as the measured tank liquid. Changes in temperature are sensed by expansion or contraction at a calibrated capillary tube. It is the primary objective of this invention to provide further improvements in the method and a device for determining this average temperature.

It is an object of this invention to provide an average temperature probe which can be manually or automatically adjusted to provide a weighted temperature average which conforms to the depth-volume profile of horizontally disposed underground cylindrical tanks.

It is another object of this invention to provide an average temperature probe which can be manually or automatically adjusted to provide an average temperature measurement in tanks of various diameters.

It is still a further object of this invention to provide a method and means for determining such an average temperature and a temperature difference over a period of time with the ultimate accuracy of the means which defines the international temperature scale.

The foregoing objects of this invention have been accomplished in an average temperature sensing device in which the outer sheath of the sensor is an extensible, cylindrical helical coil of plastic tubing which can be immersed in and extended over the height of the liquid, the temperature of which is being measured. The sensing medium extends the length of the tubing, and in its preferred form is a length of platinum wire. Since the international temperature scale is defined between −190° C. and +600° C. (−310° F. to 1112° F.) by the electrical resistance of a platinum resistance thermometer, platinum resistance wire of the requisite purity is available for thermometry. The plastic tubing is closed at one end of the helical coil, and the platinum sensing wire extends from a connector end of the coil in a loop to the closed end of the coil and back to the connector end. The platinum wire is insulated preferably by a 1/16" diameter plastic sleeve. At the connector end of the helical coil, the plastic tubing is sealed with an electrical connector which connects a single lead wire to one end of the sensing wire loop and two lead wires to the other end of the sensing wire loop to provide a conventional three lead wire system which when used with a wheatstone bridge resistance measuring system, nullifies the resistance of the lead wires. The plastic tubing of the helical coil is preferably preformed with more coil turns at its center than at its ends, actually a decreasing number of coil turns per unit length from the center to each end of the helical coil, so that when the coil extends over the diametrical height of a cylindrical tank the proportions of coil turns remains constant to provide proportionately more sensing wire at the center of the tank where the volume is greatest and a decreasing amount of sensing wire away from the tank center towards the top and bottom of the tank to match the decreasing volume profile. A weight is attached to the closed end of the coil so that as the helical coil is introduced into the tank, usually a top fill pipe, the coil automatically extends or stretches by gravity to match the tank diameter. Typically, a single helical coil may be used to measure the average temperature in tanks ranging in diameter from two to 20 feet.

Alternatively, the plastic tubing can be formed with a uniform spacing between coil turns along its length, and an extendible rod can be inserted in the center of the coil, and the turns arranged along the rod to extend the height of the tank and spaced with more turns at the center to provide the proper weighting of the coil for the liquid volume of the tank cross-section. In leakage measurements, the tank is normally completely filled to establish the predetermined length to which the coil will be extended. In some instances, however, it may be necessary to determine the average temperature of a tank partially filled with liquid. With the use of an extendible rod the proper depth and location of the coil turns can be established to be commensurate with the liquid volume profile in the tank. Also, the extendible rod can be used in tanks which are not round, e.g. rectangular tanks or any tank with a non-uniform depth-volume profile, to match the coil turn positioning with the liquid volume profile.

The sensing probe is connected by the three lead wire system to a self-balancing bridge circuit instrument having a digital readout which displays temperature or temperature changes to 1/1000° F.

The method of determining the average temperature of the liquid in cylindrical underground tank involves the steps of determining the level of the liquid in the tank, usually by filling the tank completely for leak detection purposes, or in the case of partially filled tank measurement, by the use of the extendible rod. The extensible helical coil is introduced into the tank and extended to the depth of the liquid being tested. The extension step can be by gravity or by manual adjustment of the coil along the extendible rod positioned in the center of the coil. With a helical coil preformed for circular tank use, the coil turns will be positioned by the gravity extension of the coil to match the volume profile of the tank, or this step can be performed manually by distribution of the coil turns along the length of the extendible rod. The average temperature is determined by sensing the physical property of the probe medium, which in the case of platinum wire is the electrical resistance. An average temperature indication is observed on a digital display.

The method of determining the average temperature difference of a liquid in a cylindrical tank over a period of time includes the steps of positioning the helical coil within the tank, and observing a first average temperature value and after a period of time observing a second temperature value and subtracting the second temperature value from the first temperature value to determine said average temperature difference.

The preferred embodiments of the invention are illustrated in the drawing in which.

Figures 1, 2:
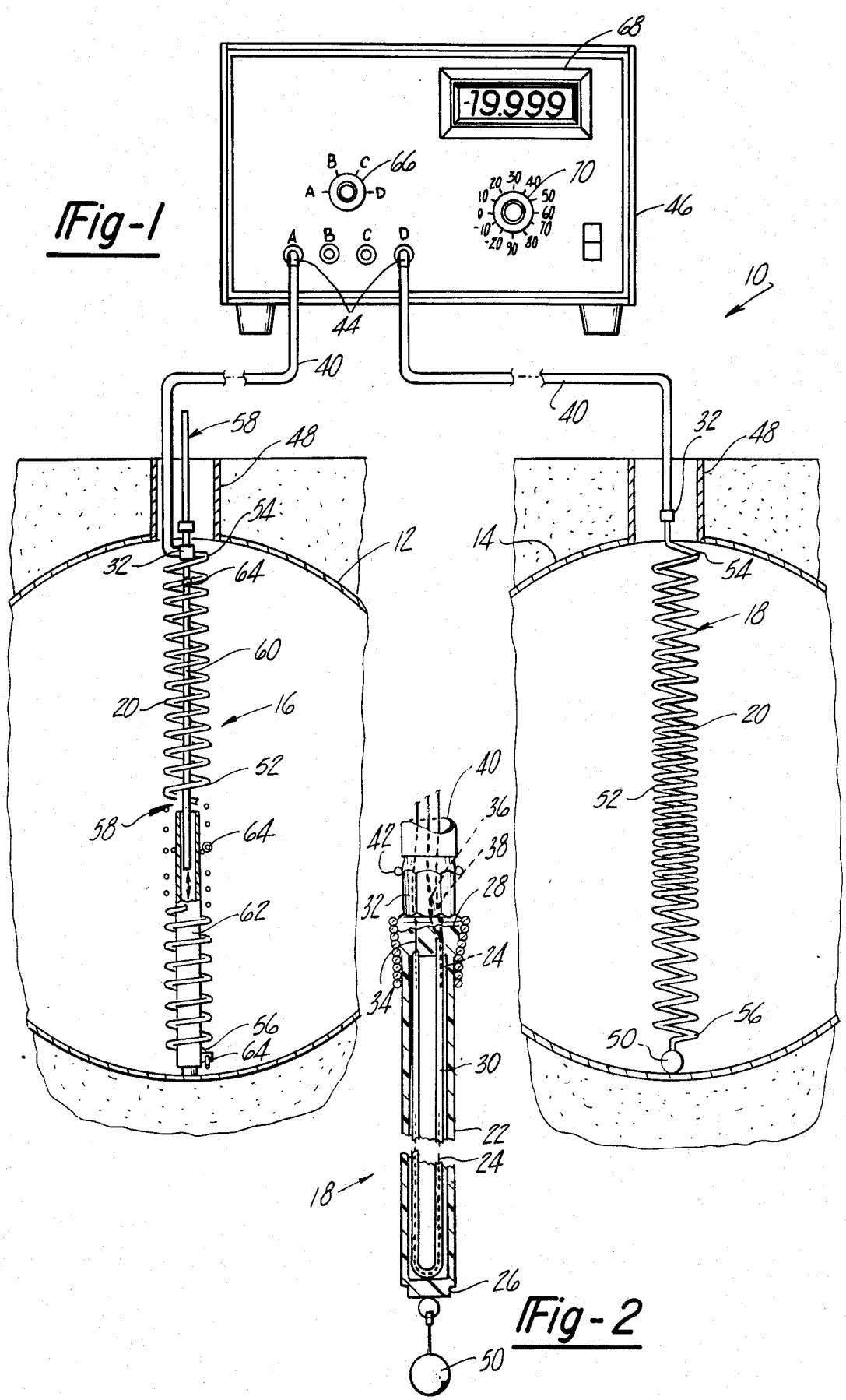
FIG. 1 is a schematic drawing showing the apparatus of the invention applied to separate tanks with a common measuring and indicating instrument.
FIG. 2 is a fragmented cross sectional view of the helical coil temperature averaging sensor showing the internal details at both ends of the coil.

Referring to FIG. 1, a temperature measuring system 10 is shown to illustrate the method of determining average temperature and average temperature difference in horizontally disposed cylindrical tanks 12 and 14 with temperature averaging probes 16 and 18 in the form of extensible cylindrical helical coils. Each temperature probe 16 and 18 are formed with a plurality of coil turns 20, and each probe has the same internal construction as shown in FIG. 2.

The outer sheath of the probes 16 and 18 is a plastic tube 22 of a material such as nylon which is chemically inert, pliable and easily formed into the helical coil. The sensing medium extends the entire length of the tubing, and in its preferred form is a length of small diameter platinum wire 24. The outer plastic tubing 22 is closed at one end 26 of the helical coil, and the platinum sensing wire 24 extends from the other end 28 of the helical coil in a loop to the closed end 26 and back to the other end 28. The platinum wire is insulated preferably by a 1/16" diameter plastic sleeve 30. The end 28 of the helical coil 18 is sealed with an electrical connector 32 which connects a single lead wire 34 to one end of the platinum wire 24 and double lead wires 36 and 38 to the other end of the platinum wire 24 to provide a conventional three lead wire system which eliminates lead wire resistance error when connected to a wheatstone bridge circuit for measuring resistance. A three wire cable 40 is connected and sealed at 42 to the free end of the connector 32. A plug-in connector 44 at the other end of the cable 40 connects the sensing probe 16 to measuring and display module 46.

Coil 18 is introduced into cylindrical tank 14 through fill pipe 48 and is extended over the diametrical height of the tank. A weight 50 is connected to end 26 of coil 18, allowing the coil to extend by gravity. The plastic tubing 22 of temperature sensing probe 18 is preformed with more of its individual coil turns 20 at its center area 52 than at its end areas 54 and 56. More precisely, there is a decreasing number of coil turns 20 from the center 52 to each end 54 and 56 to match the proportionately greater volume of liquid at the center of the cylindrical tank and lesser volume toward both ends which proportionately provides more sensing wire 24 at the center 52 and a decreasing amount of sensing wire 24 toward the top 54 and bottom 56 to give a weighted temperature average matching the volume profile of the tank.

Temperature averaging probe 16 is constructed in the same manner as probe 18 except that the individual coil turns 20 are evenly spaced along its length and a weight is not attached to its closed end 28. An extendible rod 58 having two or more telescoping sections 60 and 62 is inserted through the center of the helical coil probe 14, and the individual coil turns 20 are arranged along the length of the rod 58 before being inserted into tank 12 through fill pipe 48. Since there is no flow of liquid during the measurement process, the coil will retain its placement along rod 58. However, clips 64 can also be used along the length of rod 58 to retain the coil in its preplaced position. In the normal leak testing condition, the tank will be full of liquid, and the coil turns 20 of probe coil 16 would be normally arranged the same as in the preformed coil 18 with the greater number turns at the center of the tank. Even spacing is actually shown for coil 18 for greater clarity of other details. In instances where the temperature is to be determined of a partially filled tank, the rod 58 would be used as a dip stick to determine the height of liquid in the tank, and the coil would then be arranged accordingly. For example, if the level shown on rod 58 indicates the tank is half full, the individual coil turns 20 would be arranged with the greatest number at the top end 54 and a decreasing number to the bottom end 56 of the coil. It should be noted that lead wire cable 40 would extend into the tank to connector 32 at the upper end of the coil.

The measuring and display module 46 of FIG. 1 is shown with four plug-in jacks, A, B, C, and D to receive up to four plug-in connectors 44 of four separate temperature sensing probes, the connection of temperature probe 16 being shown to A and temperature probe 18 to D. Selector switch 66 is used to connect the specific probe A–D to the measuring instrument, and the digital display 68 indicates the temperature thereof with a smallest increment of 1/1000° F. In the case where average temperature difference is being determined, the actual temperature is of no concern, only the observed change over a period of time. Adjusting potentiometer 70 permits the user to obtain a starting null by turning its dial pointer to ambient temperature.

The embodiments of the invention in which an exclusive property of privilege is claimed is defined as follows:

1. A temperature averaging sensor for measuring the average temperature of a fluid confined within a tank having a nonuniform depth-volume profile comprising, in combination: a length of wire with a known electrical resistance versus temperature characteristic; an extensible cylindrical, multi-turn helical coil of plastic tubing in which said length of wire is contained; means for extending said coil to a predetermined length corresponding to the depth of fluid within said tank and means for arranging the spacing between coil turns so that the density of coil turns is commensurate with the depth-volume profile of the liquid in said tank; and an electrical connector connected to each end of said wire and adapted to be connected to a measuring circuit.

2. The temperature averaging sensor of claim 1 wherein said length of wire is platinum of a uniform diameter.

3. The temperature averaging sensor of claim 1 and further comprising an electrical insulation covering said wire, said insulated wire being inserted in said extensible coil of tubing.

4. The temperature averaging sensor of claim 1 in which said electrical connector sealingly engages one end of said extensible coil and the other end of said extensible coil is closed.

5. The temperature averaging sensor of claim 4 wherein said length of wire extends from closely adjacent said connector to said closed end of said extensible coil and back to a point closely adjacent to said connector.

6. The temperature averaging sensor of claim 5 wherein one end of said sensing wire is connected to said connector by a single lead wire and the other end of said length of sensing wire is connected by two lead wires to said connector, thereby forming a three wire system.

7. The temperature averaging sensor of claim 4 wherein said coil is preformed with relative spacing between coil turns to match the density of coil turns with the depth-volume profile of the liquid in said tank, said means for extending said coil includes a weight connected to the closed end of said extensible coil, whereby said coil is extended to said predetermined length and arranged in a volume-temperature averaging relationship.

8. The temperature averaging sensor of claim 4 wherein said means for extending said coil to a predetermined length includes an extensible rod passing through the center of said extensible coil, the rod being attached at its end to the closed end of said extensible coil and the means for arranging said coil with a matching coil turn density includes a plurality of clips mounting said coil turns to said rod.

9. The temperature averaging sensor of claim 7 wherein said extensible cylindrical helical coil of plastic tubing is preformed with a greater number of coil turns at its longitudinal center.

10. The temperature averaging sensor of claim 9 wherein said extensible cylindrical helical coil of plastic tubing is further preformed with the spacing between successive coil turns increasing toward each end of said coil.

11. The method of determining the average temperature of a liquid within a tank having a nonuniform depth-volume profile comprising the steps of: determining the level of the liquid in the tank; introducing an extensible helical coil of plastic tubing vertically into said tank, said tubing having a temperature responsive medium within it extending the length of said tubing, said medium having a known physical property versus temperature characteristic; arranging the relative spacing between coil turns so that the density of coil turns is commensurate with the depth-volume profile of the liquid in said tank; extending the length of said tubing coil to extend over the depth of the liquid being tested; sensing said physical property and reducing it to a temperature value.

12. The method of determining the average temperature of a liquid in a tank according to claim 11 wherein the extensible helical coil of plastic tubing is preformed with said relative spacing between coil turns and is introduced into the tank with one end located at said determined level and the coil is allowed to extend downward in the tank by gravity to extend over the depth of the liquid being tested.

13. The method of determining the average temperature of a liquid in a tank according to claim 11 wherein the step of determining the level of the liquid in the tank is accomplished by filling the tank completely with said liquid and the step of extending and arranging the helical coil is extending it to the full height of said tank and arranging the coil turn density to match the depth-volume profile of said tank.

14. The method of determining the average temperature of a liquid in a cylindrical tank having a horizontally disposed axis according to claim 13 wherein the extensible helical coil which is introduced into said tank has been preformed so that a greater density of coil turns is located at its mid point and proportionately a lesser density of coil turns are located extending upwardly and dowardly from said mid point and wherein the step of extending and arranging the helical coil is accomplished by holding the upper end of the coil at the top of said tank and allowing it to extend downward by gravity to span the full height of said tank, the coil turns become arranged so that the magnitude of the physical property being measured compensates for the greater volume of liquid being located towards the center of the tank.

15. The method of determining the average temperature of a liquid in a tank according to claim 11 wherein an extendible rod is introduced into said tank with said extensible helical coil and is used to position said extensible helical coil to extend over the entire depth of the liquid being tested and said coil turns are arranged relative to said rod to match the coil turn density with said depth-volume profile of the liquid.

16. The method of determining the average temperature of a liquid in a cylindrical tank having a horizontally disposed axis according to claim 15 wherein the step of determining the level of the liquid in the tank is accomplished by filling the tank completely with said liquid and the coil is arranged relative to said rod with the number of coil turns being greater as the extended coil approaches the center of the tank.

* * * * *